Sept. 14, 1926.
P. M. SLEE
1,599,847
VEGETABLE CUTTER
Filed Nov. 11, 1924  3 Sheets-Sheet 2
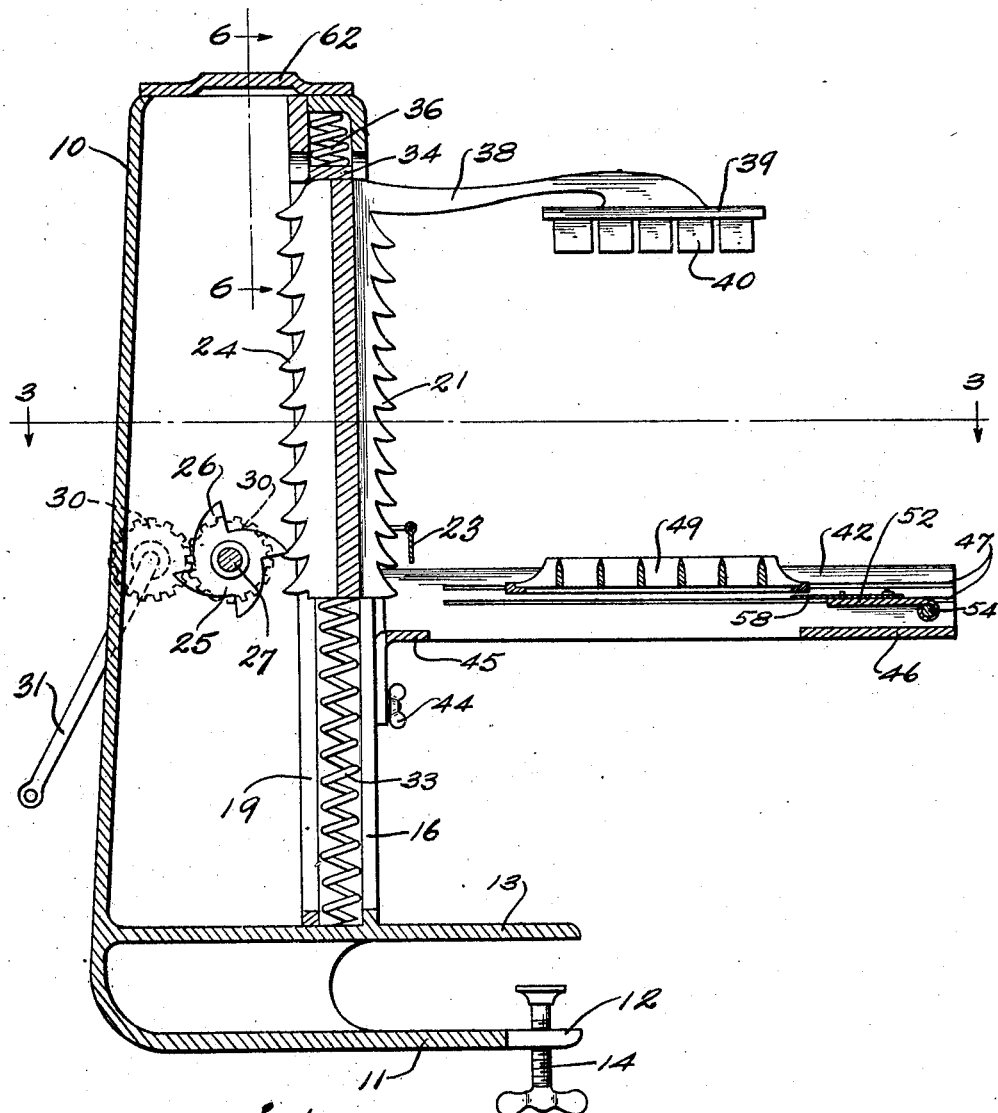
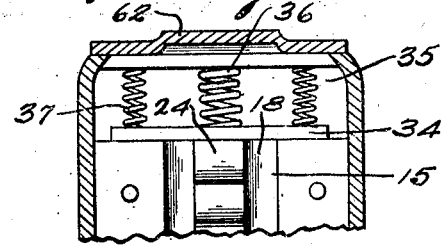
Inventor
Pearl M. Slee
By
Attorney

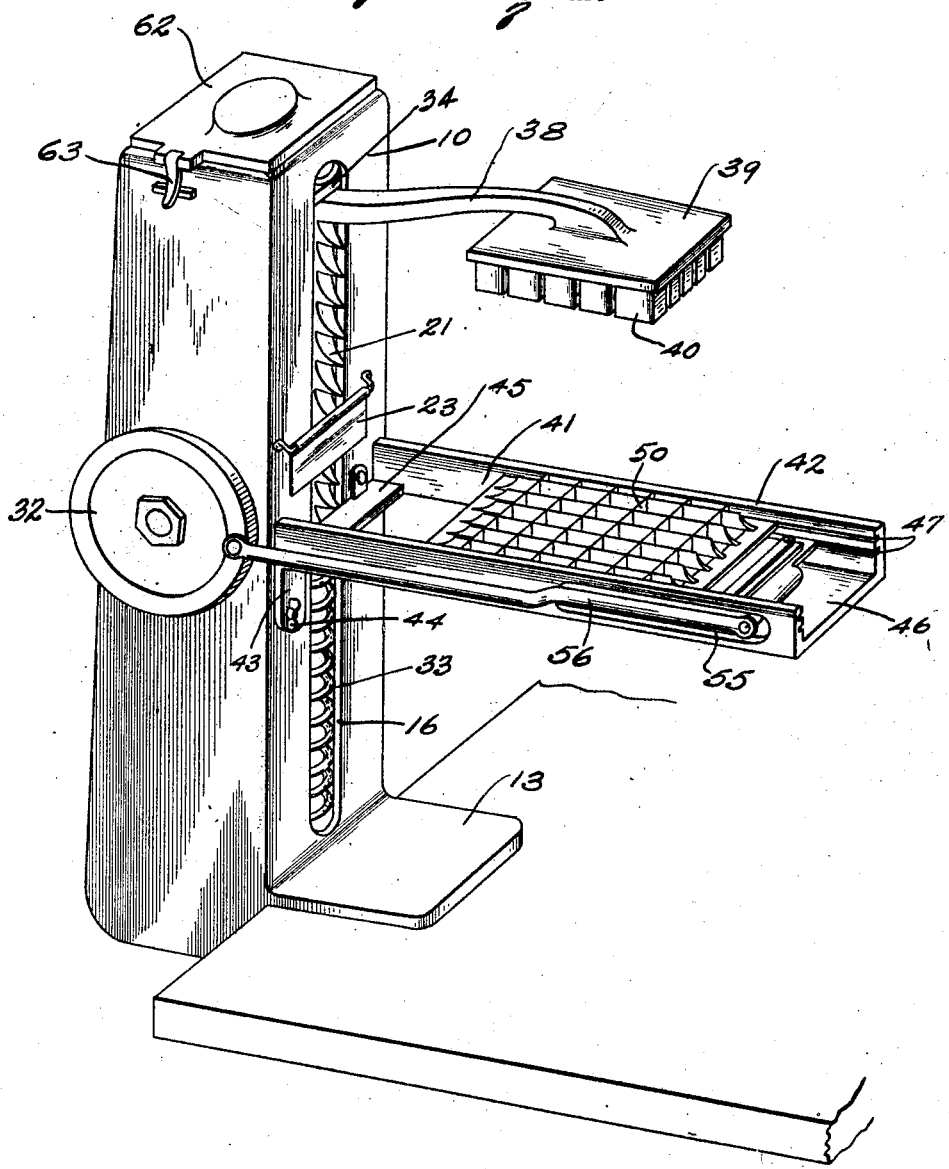

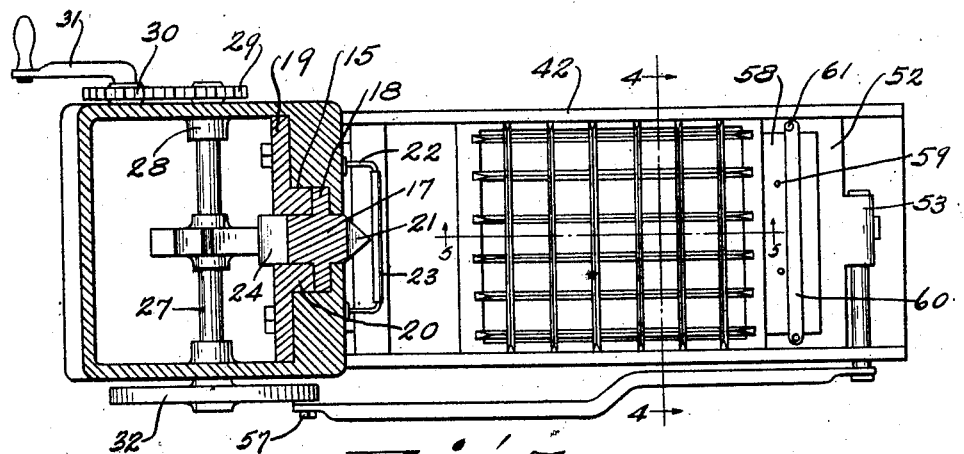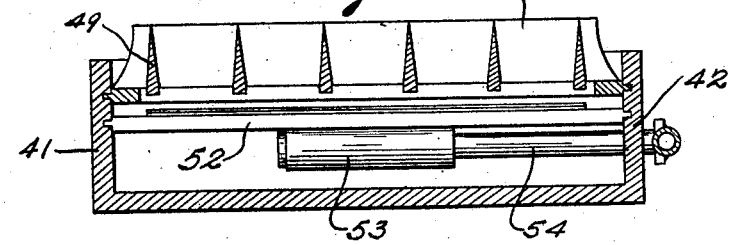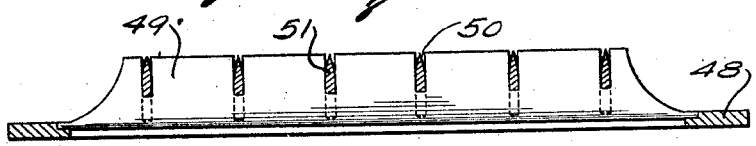

Patented Sept. 14, 1926.

1,599,847

UNITED STATES PATENT OFFICE.

PEARL M. SLEE, OF NAPOLEON, OHIO.

VEGETABLE CUTTER.

Application filed November 11, 1924. Serial No. 749,223.

This invention relates to improvements in vegetable cutting machines.

An important object of the invention is to provide an apparatus having means for forcing vegetables upon a series of cutting blades and cutting the same into cubes.

A further object of the invention is the provision of an apparatus of this character adapted to quickly and easily cut vegetables and fruit into small particles.

A still further object of the invention is the provision of a device of this character which may be readily mounted upon a table and will readily cut the fruit and vegetables into any desired sizes.

A further object of the invention is the provision of a cutter of this character which will quickly and efficiently cut fruits and vegetables into cubical blocks and which may be operated without great effort.

A still further object of the invention is the provision of a cutter of this character whereby a retaining arm will be returned to its original position by means of a spring or the like.

Other objects and advantages of this invention will be apparent during the course of the following description.

In the accompanying drawings forming a part of this specification and in which like numerals are employed to designate like parts throughout the same:

Figure 1 is a perspective view showing my improved cutting machine secured in position upon a table, Figure 2 is a vertical sectional view taken through the device, Figure 3 is a horizontal sectional view taken on the line 3—3 of Figure 2, Figure 4 is a vertical sectional view taken on the line 4—4 of Figure 3, Figure 5 is a longitudinal sectional view taken on the line 5—5 of Figure 3, and Figure 6 is a vertical sectional view taken on the line 6—6 of Figure 2, showing the fastening plate removed.

In the drawings, wherein for the purpose of illustration is shown the preferred embodiment of my invention, the numeral 10 generally indicates a hollow standard or casing, this casing being preferably somewhat tapered in construction to properly house the mechanism therein. The lower portion of the casing is provided with a flat plate 11 extending somewhat in front of the casing and provided with a pair of projecting brackets 12. A suitable distance above the plate 11 is a brace plate 13, the distance between these plates being sufficient to permit engagement of the ordinary table board. The plate 13 is adapted to rest on the top of the table while the plate 11 and projections 12 formed thereon engage the lower side of the table board, a pair of rotatable clamps 14 being threadedly mounted through the projecting brackets 12 and adapted to forcibly engage the table and prevent movement of the device thereon.

The front wall of the casing 10 is of substantially heavier construction than the remaining walls, the central portion thereof having a comparatively wide longitudinal groove 15 formed on the inner side with a somewhat narrower slot 16 formed entirely through the center thereof.

A rack bar 17 is adapted to vertically slide in the center of the front casing wall, this bar being provided with longitudinal strips 18 formed on the sides thereof to provide guides. The guides engage the inner sides of the front wall and snugly fit within the groove 15 formed therein, the bar being retained in position by a fastening plate 19 bolted or otherwise secured to the inner side of the front wall. This plate 19 is provided with inwardly extending webs 20, these webs being adapted to extend within the grooves and guide movement of the rack bar.

The front edge of the rack bar 17 is provided with a plurality of pointed projections or teeth 21, extending through the slot 16 and inclined downwardly, providing means for stopping the bar during operation of the machine. A U-shaped bar 22 is secured to the front wall of the machine and supports a rotatable plate 23 mounted on the intermediate portion of the bar and adapted to engage the projections 21 and prevent upward movement of the rack bar when the plate 23 is forced inwardly. The rear edge of the rack bar 17 is provided with arcuate teeth 24, these teeth being adapted to engage the extremities of a toothed gear 25. The gear 25 is preferably constructed with four projections or teeth 26, so arranged as to entirely clear the rack bar when the teeth thereon are out of engagement with the same. The gear is rigidly secured to a transverse shaft 27 extending through the sides of the casing and supported by suitable bearings 28. One extremity of the shaft projects through the casing and carries a comparatively small spur gear 29, this gear being adapted to mesh with a similar gear 30 journaled on the side of the casing and having secured thereon a handle 31. It is obvious that rotary movement of the handle 31 will cause similar movement of the gear 30 mounted thereon and the spur gear 29 revolving the shaft and gear 25 mounted on the central portion. The opposite extremity of the shaft 27 also projects through the side of the casing and carries a wheel 29 secured thereon and adapted to rotate with the shaft.

The rack bar 17 is normally forced toward the upper portion of the casing by a coiled spring 33 positioned between the lower extremity of the rack bar and casing bottom and adaped to retain the bar in the raised position. In order to prevent the occurrence of undue shock on the upper portion of the casing I provide a transverse bumper strip 34 positioned at the upper extremity of the front casing wall and resting upon the upper portions of the enlarged wall section, this strip being adapted to move in a suitable reces 35 formed in the upper portion of the wall. The strip 34 is retained in position on the enlarged wall section by means of a comparatively heavy coil spring 36 positioned on the central portion of the strip, and a pair of somewhat smaller springs 37 positioned near the extremities of the strip and adapted to absorb the shock occasioned by the return of the rack bar. The bumper strip 34 is constructed of rigid material, preferably hard rubber or any suitable composition.

Formed integral with or secured to the upper extremity of the rack bar 17 is a forwardly extending arm 38, this arm supporting a rectangular plate 39. The underside of the plate carries a plurality of block like projections 40, these blocks being adapted to engage suitable receses and force the vegetable therethrough.

Secured to approixmately the central portion of the front casing wall is a forwardly extending frame 41, this frame comprising a pair of longitudinal braces 42 extending horizontally from the casing and bracket plates 43 formed on the extremities of the braces and adapted to secure the frame to the casing. The plates 43 are provided with suitable openings through which are extended bolts and wing nuts 44 adapted to securely retain the braces upon the casing and at the same time permit ready removal thereof. The extremities of the braces are secured by transverse plates 45 and 46 connecting the braces and strengthening the supporting frame. The inner sides of the braces 42 are provided with oppositely positioned grooves 47, there being two pairs of these grooves formed in the braces and extending from the forward extremities to very nearly the rear extremities.

A metallic frame 48 provided with tongues on the longitudinal edges thereof is slidably mounted in the upper brace grooves, this frame being adapted to support the cutting knives. A plurality of longitudinal knives 49 are positioned in suitable notches formed in the end strips of the frame 48, these knives being equally spaced and provided with a plurality of equally spaced slots 50 in the upper portions thereof. A similar number of transverse knives 51 are mounted on the knives 49, the latter knives being provided with slots in the lower portions adapted to suitably engage the slots 50 formed on the longitudinal knives. In this manner the knives are locked in position and the upper cutting edges thereof are on a level plane forming a surface adapted to readily sever any matter forced downwardly thereon. After the knife retaining frame 48 is forced in the upper grooves 47 formed in the braces the frame remains in a stationary position immediately beneath the block supporting plate 39, the projections formed in the lower portions of the plate 39 being adapted to pass between the blade members and force the vegetable matter therethrough. A blade supporting plate 52 is transversely mounted in the frame, this plate being also provided with tongues to permit same to slide in the lower brace grooves. A sleeve 53 is formed on the forward edge of the plate and is adapted to form a bearing for one extremity of a transverse rod 54. This rod may be securely fastened in the sleeve 53 and extends horizontally through a longitudinal opening 55 formed on one side of the frame 41. A longitudinal connecting rod 56 is pivotally connected to the outer extremity of the rod 54, this connecting rod being preferably off set as clearly shown in Figure 3 and rotatably mounted upon a crank pin 57 secured to the wheel 32. It is obvious from this structure that rotation of the wheel 32 will impart reciprocatory movement to the connecting rod 56 imparting similar movement to the plate 52 mounted in the grooves in the frame.

Mounted upon the plate 52 and extending substantially from the rear edge thereof is a cutting blade 58, this plate being preferably provided with a plurality of openings adapted to engage suitable pins 59 positioned on the upper portion of the plate 52, thereby retaining the blade rigidly on the plate and preventing horizontal movement thereof. In order to prevent vertical displacement of the blade I provide a locking bar 60 pivotally mounted near one edge of the plate 52 and provided on the other extremity with a slot adapted to permit engagement of a retaining pin 61. This arrangement will retain the blades securely in position on the plate and permit the same to readily sever the downwardly projecting portions of vegetable matter forced through the knife members as the plate and blade 58 mounted thereon move thereunder.

The upper extremity of the casing 10 is enclosed by a cover 62 hingedly mounted on the casing and locked in position by a swinging catch 63. This form of cover will readily permit access to the inside of the casing to replace or adjust any parts of the mechanism therein, in addition to providing a compact and durable structure.

In using the machine, the operator places the vegetable matter on the upper edges of the knives 49 and 51, the crushing plate 39 being elevated to its utmost position by means of the coiled spring member 19. After the vegetables have been placed upon the cutting knives the crushing plate is lowered by rotation of the handle 31, the arrangement of gears on the handle and transverse shaft enabling the operator to operate the handle with one hand while retaining the vegetables in position upon the cutting knives with the other. While the vegetable matter is being forced through the knife members the handle is rotated quite rapidly causing the teeth upon the gear 25 to mesh with the teeth 24 formed on the inner side of the rack member, forcing the rack and crushing plate gradually downward. When the crushing plate has descended to a position immediately above the edges of the cutting knives the handle is rotated slowly permitting the blocks 40 formed on the crushing plate to enter the spaces formed by the intersecting knives. As soon as it is apparent that the blocks are about to enter the spaces formed between the knife members the handle is rotated slowly until the next tooth member on the driving gear 25 disengages the teeth 24 formed on the inner side of the rack, permitting the lower coiled spring 19 to force the rack upwardly at this position of the crushing plate. This is accomplished by the particular design of tooth members formed on the driving gear 25, enabling the teeth to entirely disengage the rack teeth and permit elevation of the rack. During the downward movement of the rack the gear 25 is retained in engagement with the teeth by rapid revolution of the handle retaining the teeth on the gear in practically constant engagement with the rack teeth and preventing elevation of the rack. If the operator finds it desirable to leave the machine for any reason after the vegetable matter has been partly forced through the cutting knives the rack may be locked in position by movement of the locking plate 23, this plate being forced inwardly and engaging the pointed projections 21 formed on the outer side of the rack member.

It is obvious that my improved machine possesses unlimited utility in cuisines, assisting chefs and housewives in the preparation of vegetables and the like. The vegetables or other matter may be cut in various sizes and forms by slightly changing the structure of the machine and inserting cutting knives adapted for the desired forms.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, I claim:

1. A vegetable cutter comprising a standard, a movable rack member slidably mounted on said standard, a plurality of knife blades supported by said standard, a member carried by said rack member for engaging vegetables in order to feed the same towards said knife blades upon movement of said rack member, a movable knife arranged below said knife blades, means for reciprocating said movable knife upon movement of said rack bar, a rotatable member mounted on said standard, means for rotating said rotatable member, teeth arranged upon said rotatable member for striking the rack portion of said slidable member in order to move said slidable member upon rapid rotation of said rotatable member, spring means for moving said rack member in the opposite direction, the teeth on said rotatable member being sufficiently spaced so that when the rotation of said rotatable member diminishes below a certain speed, said spring means will return said rack member to its initial position.

2. A vegetable cutter comprising an upright standard, a member slidably mounted on said standard, a plurality of knife blades supported by said standard, means carried by said slidable member for feeding vegetables towards said knife blades upon downward movement of said slidable member, spring means for normally holding said slidable member in its extreme upper position, and means adapted to engage said slidable member when operated at a certain speed so as to force said slidable member downwardly and so arranged as to permit said slidable member to be moved upwardly by said spring means when the speed of the operation of said means diminishes below a certain speed.

3. A vegetable cutter comprising an upright standard, a member slidably mounted on said standard, a plurality of knife blades supported by said standard, means carried by said slidable member for feeding vegetables towards said knife blades upon downward movement of said slidable member, spring means for normally holding said slidable member in its extreme upper position, means adapted to engage said slidable member when operated at a certain speed so as to force said slidable member downwardly and so arranged as to permit said slidable member to be moved upwardly by said spring means when the speed of the operation of said means diminishes below a certain speed, a movable knife blade arranged below said plurality of knife blades, and means for reciprocating said movable knife blade upon downward movement of said slidable member.

In testimony whereof, I have affixed my signature.

PEARL M. SLEE.